Dec. 16, 1941.   P. BEYERLEIN   2,265,995
DIE OR PRESSURE CASTING MACHINE FOR PLASTIC MASSES
Filed April 15, 1938

Inventor
Paul Beyerlein

By Hutz and Joslin
attys.

Patented Dec. 16, 1941

2,265,995

UNITED STATES PATENT OFFICE 2,265,995

DIE OR PRESSURE CASTING MACHINE FOR PLASTIC MASSES

Paul Beyerlein, Cologne-Braunsfeld, Germany, assignor to Eckert & Ziegler G. m. b. H., Cologne-Braunsfeld, Germany Application April 15, 1938, Serial No. 202,287
In Germany April 23, 1937

2 Claims. (Cl. 18—30)

This invention relates to die or pressure casting machines for plastic masses.

In die or pressure casting machines for plastic masses in order to prevent a considerable further quantity of the mass from flowing out of the nozzle orifice after the nozzle has been separated from the mould, the result of which would be to interfere with the proper operation of the machine, it has previously been proposed to insert in the front part of the nozzle a closure member which is opened by a controlling device before the beginning of the extrusion process and is closed after the extrusion process is complete.

A closure of this type is considerably simplified by means of the present invention because the controlling device for the closure member is eliminated.

In a construction in accordance with the invention, the nozzle is mounted in the nozzle head so as to be axially displaceable therein and is provided with transverse passages leading from the nozzle passage; when the cylinder containing the plastic mass is withdrawn, the nozzle is held by a spring in a position in which the transverse passages are shut off from the passage through which the mass is supplied and, when the nozzle is applied to the casting mould, the nozzle is moved into a position in which the passage through which the mass is supplied is brought into communication by way of the transverse passages with the nozzle orifice. The opening of the closure member at the correct time therefore takes place automatically without the aid of a controlling device solely owing to the nozzle bearing against the mould and the closing is effected by the spring. The nozzle itself is constructed as the closure member while the nozzle head acts as a casing in which the nozzle slides.

Preferably, as an additional safeguard, the nozzle is provided with a stop which limits its stroke and has a seating surface which, when the transverse passages are in the closed position, bears against a seating provided on the nozzle head. If the stop is constructed in the form of a plate valve, a double security is obtained, the nozzle passage being shut off firstly by the closure of the transverse passages of the nozzle by the nozzle head and secondly by the plate valve.

Figure 1:
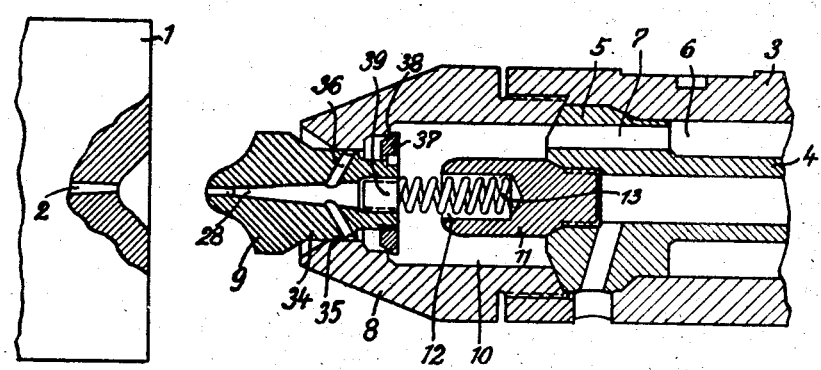

A constructional form of closure device in accordance with the invention is illustrated by way of example in the accompanying drawing, in which Figure 1 is a longitudinal section through one form of construction of the front end of the cylinder containing the plastic mass and the mould which coacts with it before the two parts are brought into contact with one another.

Figure 2:
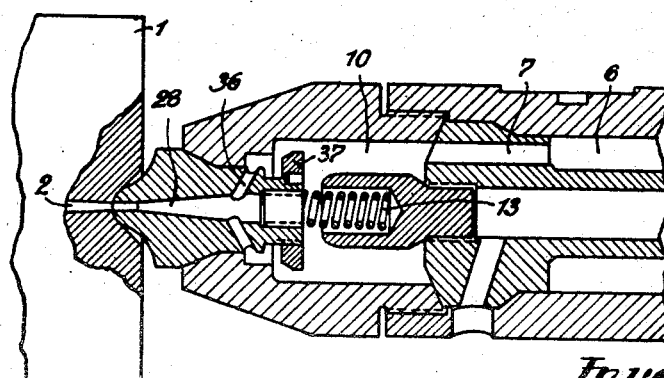

Figure 2 is a view showing the positions of the parts shown in Figure 1 during the casting process.

In the form of construction according to Figures 1 and 2 the automatic opening of the closure member is effected owing to the mass or nozzle meeting the mould.

In the cylindrical body 3 is inserted a pipe 4 which is provided in front with an enlargement 5. The annular space 6 between the pipe 4 and the cylindrical body 3 forms the passage through which the mass is fed under high pressure by a plunger which is moved in a cylinder in which the mass in contained. The enlargement 5 is provided with a passage 7 which is in communication with the annular space 6. In the cylindrical body 3 is screwed the nozzle head 8 in the front of which is inserted the nozzle 9. Between the nozzle 9 and the enlargement 5 there is a space 10 in which the cylinder 11, which is fixed in the pipe 4, is situated. This cylinder has a recess 12 in which a spring 13 is disposed.

The nozzle 9 is axially displaceable in the head 8. For this purpose the nozzle is provided with a neck 34 which is guided in a cylindrical aperture 35 in the nozzle head. The nozzle has a passage 28 which tapers conically towards the orifice and from which transverse passages 36 extend. At the inner end of the neck 34 is fixed the plate 37 of a plate valve, the seating surface 38 of which is provided on the nozzle head 8. The inner end of the passage 28 is closed by a plug 39 against which the spring 13 bears.

The transverse passages 36 are so arranged that, when the nozzle 9 is separated from the mould 1, their outer orifices are covered by the surface of the aperture 35 in which the nozzle head 8 is guided. Under the action of the spring 13 the plate 37 is pressed against its seating 38. Therefore the nozzle passage 28 is closed at two places to the passage 10 through which the mass to be cast is fed.

When the cylinder containing the mass is moved forward, the nozzle 9 is brought into contact with the mould, and is pressed back into the position shown in Figure 6. It thereby opens the plate valve 37 and the transverse passages 36 are placed in communication with the space 10. The mass can therefore pass through the passages 6 and 7 the space 10 and the transverse passages 36 to the nozzle passage 28. When the cylinder containing the mass is withdrawn the parts again move back under the action of the spring 13 into the position illustrated in Figure 5 in which the passage through which the mass is fed is doubly closed to the nozzle passage 28. Therefore only the very small quantity of mass which is contained in the nozzle passage 28 can escape.

The spring which acts on the closure member can, if necessary, also be arranged outside the passage through which the mass is supplied.

I claim:

1. The cylinder of a die-casting machine for plastic materials provided with a closure member for its nozzle which comprises, in combination, a cylindrical body, a hollow nozzle head attached to said body, said body and said head being provided with connecting passages for the movement of plastic material from the one into the other during casting, an axially displaceable nozzle inserted into the front end of said head and extending with its rear portion into the hollow space of said head, said nozzle being provided with a central passage closed at said rear portion and with transverse passages extending from the central passage, a plug-like element attached to said cylindrical body within said hollow space and arranged therein opposite to and co-axially with said nozzle, and a compressible spring disposed on the one end of said element and bearing against the closed inner end of said nozzle, said transverse passages extending through the nozzle in relation to the nozzle head so that they communicate with the hollow space of said head when the nozzle is displaced rearwardly in the front end of the head against the action of the spring, but are shut off from communication when the action of the spring forwardly displaces the nozzle in said head.

2. The cylinder of the die-casting machine in accordance with claim 1 in which a seating surface is provided in the inner front end of the nozzle head, and a plate is fixed to the rear portion of the nozzle, said surface and said plate co-acting to function as a valve which is open when the nozzle is displaced against the action of the spring, but closes when the action of the spring forwardly advances the nozzle in the head.

PAUL BEYERLEIN.